United States Patent
Knell et al.

[15] 3,671,574
[45] June 20, 1972

[54] PREPARATION OF POLYFLUOROALKYL ESTERS OF FUMARIC AND OTHER ACIDS

[72] Inventors: Martin Knell, Ossining; Peter P. Klemchuk, Yorktown Heights, both of N.Y.

[73] Assignee: Ciba-Geigy Corporation

[22] Filed: Dec. 19, 1969

[21] Appl. No.: 886,723

[52] U.S. Cl..................260/485 F, 117/161 UB, 260/78.4 E
[51] Int. Cl......................................C07c 69/52, C07c 69/60
[58] Field of Search........................................260/485 F, 493

[56] References Cited

UNITED STATES PATENTS 3,239,557   3/1966   Fasick ..............................260/485 F

*Primary Examiner*—Lorraine A. Weinberger
*Assistant Examiner*—E. Jane Skelly
*Attorney*—Karl F. Jorda

[57] ABSTRACT

A process for the preparation of ester compounds of the formula:

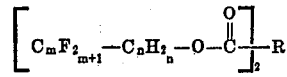

wherein $m$ is an integer of 3 to 18; $n$ is an integer of 2 to 10; and R is an ethylenically unsaturated hydrocarbon radical derived from fumaric, maleic, citraconic, mesaconic, or itaconic acid, which comprises reacting the compound $C_mF_{2m+1}$—$C_nH_{2n}X$ wherein $m$ and $n$ are as defined above, and X is iodine, bromine or chlorine with an acetate of the formula

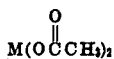

wherein M is a metal selected from cadmium, lead, mercury, and zinc, to form a polyfluoroalkyl acetate of the formula

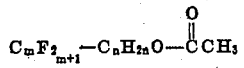

wherein $m$ and $n$ are as defined above, then reacting the polyfluoroalkyl acetate with fumaric, maleic, citraconic, mesaconic, or itaconic acid, or a diloweralkyl ester of said acid and recovering the ester from the reaction mixture. The esters prepared by the process of this invention form polymers which are useful in oil and water-repellent textile finishes.

12 Claims, No Drawings

PREPARATION OF POLYFLUOROALKYL ESTERS OF FUMARIC AND OTHER ACIDS

THE INVENTION

This invention concerns a process for the preparation of ester compounds of the formula:

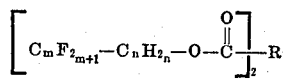
    I wherein $m$ is an integer of 3 to 18, preferably 6 to 12 and most preferably 6 to 10; $n$ is an integer of 2 to 10 and is preferably 2 or 3, and most preferably 2; R is an ethylenically unsaturated hydrocarbon radical derived from fumaric, maleic, citraconic, mesaconic, or itaconic acid, preferably maleic or fumaric acid.

These compounds may be polymerized to polymers which are valuable in forming fabric finishes having excellent soil repellent properties. The oil and water repellent finishes of textiles treated with compositions containing such polymers are generally fast to repeated washing and dry-cleaning and thus retain their excellent soil repellency for long durations.

Particularly preferred polymers of a monomer which is prepared by the process of this invention are those of bis (1,1,2,2-tetrahydroperfluorononyl) fumarate.

The compounds for which the process of the present invention may be employed are the subject of co-pending application Serial No. 720,370 filed Apr. 10, 1968 assigned to the assignee of the present application.

Up to the time of the present invention, methods used for the preparation of such compounds were often uneconomical and in some instances, required extremely long reaction times.

The present invention comprises reacting a polyfluoroalkyl halide of the formula:

$$C_mF_{2m+1}—C_nH_{2n} X$$   II wherein $m$ and $n$ are as defined in formula I and X is iodine, bromine, or chlorine, preferably iodine, with an acetate of the formula

wherein M is a metal selected from cadmium, lead, mercury, and zinc, to form a polyfluoroalkyl acetate of the formula

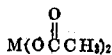

wherein $m$ and $n$ are as defined above, then reacting the polyfluoroalkyl acetate with fumaric, maleic, citraconic, mesaconic, or itaconic acid, or a diloweralkyl ester of said acid to form the ester of the formula:

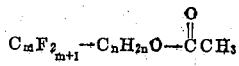
    I

The polyfluoroalkyl halide used in the above formula II may be prepared by procedures well known to those skilled in the art. For example, the preparation of polyfluoroalkyliodides of the above formula is disclosed in U.S. Pat. No. 3,145,222 Brace.

It is to be understood that the polyfluoroalkyl group may be, and usually is, a mixture of different chain lengths since the basic starting materials are obtained by telomerization procedures which yield perfluoroalkyl halides of varying lengths. Generally preferred are compounds wherein $m$ has a value of 6 to 12. The starting compounds comprising a single chain length may readily be obtained if desired by separation or synthetic techniques well known to the art.

The process of the present invention provides an economical method of making the very useful esters of formula I in high yields.

Previously known methods of preparing the corresponding acrylate or methacrylate esters have proven to be unsatisfactory for making the esters of formula I. By way of example, reaction of an alkali metal carboxylate with the polyfluoroalkylhalide results in a very undesirably high conversion to unwanted olefin. This unwanted side reaction is reduced to a minimum in the process of the present invention.

The reaction of the polyfluoroalkylhalide and specific metal acetates employed in this invention generally is carried out with the ratio of moles of halide to acetate ranging from 2:1 to 1:3 with a 1:1 ratio being preferred. The temperature of this reaction ranges from about 125° to 225° C., with a range of 150° to 190° C. being preferred.

Sufficient acetic acid to act as solvent for the reactants is employed. The reaction is carried out in a closed system, at the autogenous pressure, at the reaction temperature employed.

The polyfluoroalkyl acetate formed is isolated for use in the subsequent transesterification reaction.

If desired the oxides of mercury, lead, cadmium, or zinc may be used in place of the acetates since the corresponding acetate will be formed in the acetic acid solvent.

The preferred acetates employed in this invention are cadmium acetate and lead acetate.

The transesterification step is carried out in a temperature range of about 100° C. to about 200° C., with a temperature from about 125° C. to about 150° C. being preferred. The reaction is run at atmospheric pressure or if desired under moderate vacuum conditions. In the cases where maleic or citraconic acids or lower alkyl esters thereof are employed, it is preferable to use temperatures below 130° C. if it is desired to avoid noticeable conversion to the corresponding fumaric or mesaconic forms. In most cases however, this conversion, should it occur, is immaterial since it is not detrimental to the effective utilization of the ester monomer of formula I in forming polymers for stain repellent finishes as described in the above mentioned Ser. No. 720,370.

As used in this specification and claims the term lower alkyl represents an alkyl of one to four carbon atoms. Thus dimethyl, ethyl, propyl, and butyl esters may be employed in the transesterification reaction with the polyfluoroalkyl acetate.

Generally any suitable transesterification catalyst familial to those skilled in the art may be employed. Among those catalysts which have been used are dibutyl tin oxide, dibutyl tin diacetate, titanium isopropylate, aluminum isopropoxide, para-toluenesulfonic acid, and sulfonated polystyrene (Amberlyst 15). The amount of catalyst employed is not critical. Generally one mole of catalyst for every two to five moles of dicarboxylic acid or diester may be employed. A ratio of approximately one mole of catalyst for every three moles of diacid or diester is very satisfactory.

The following examples describing certain representative embodiments of this invention will serve to further illustrate the nature of this invention.

EXAMPLE I 52.5 g of 1,1,2,2 tetrahydroperfluorononyl iodide, 23.0 g anhydrous cadmium acetate and 175 ml of glacial acetic acid are heated in an autoclave at 180° to 185° C. with stirring at a pressure of 75 lbs/in.² for 16 hours. The reacted mixture is then washed with 350 ml water. The bottom oily layer is washed with 30 ml sodium bicarbonate. The aqueous layer is extracted with chloroform and the extract added to the oil for distillation. 39.1 g Of 1,1,2,2 tetrahydroperfluorononyl acetate boiling at 60° to 84° C. and 2–8 mm are obtained representing a yield of 85.8 percent of theoretical.

EXAMPLE II 52.4 g of 1,1,2,2 tetrahydroperfluorononyl iodide, 64.92 g of lead acetate, and 200 ml of glacial acetic acid are heated together for 21 hours at 190° to 195° C. The reaction is then cooled to 0° to 10° C. and washed with 500 ml of water, filtered, and the resulting two layers then separated. The aqueous layer is extracted with chloroform and the extract added to the oil layer which is neutralized with sodium bicarbonate. Distillation yields 38.84 g of 1,1,2,2 tetrahydroperfluorononyl acetate, b.p. 83° to 86° C. at 10 mm representing a yield of 85 percent.

EXAMPLE III 55.8 g of a mixed* (* The perfluoroalkyl iodide has the following approximate composition by weight:

| | |
|---|---|
| $C_6F_{13}CH_2CH_2$ I | 27.1% |
| $C_8F_{17}CH_2CH_2$ I | 59.4% |
| $C_{10}F_{21}CH_2CH_2$ I | 12.1% ) | telomer iodide of 1,1,2,2 tetrahydro($C_8$–$C_{12}$) perfluoroalkyl iodide containing approximately 28% $C_8$, 60% $C_{10}$ and 12% $C_{12}$, 64.92 g of anhydrous lead acetate, and 220 ml of acetic acid are heated at 190° to 195° C. for 21 hours. The reacted mixture II is prepared for distillation as in Example 2. Distillation yielded 39.55 g of the mixed telomer ($C_8$–$C_{12}$) 1,1,2,2 tetrahydroperfluoroalkyl acetate boiling at 80° to 120° C. at 12 mm. Yield 80.6 percent of theoretical.

EXAMPLE IV

The procedure of Example III is repeated, but substituting 26.65 g cadmium acetate dihydrate for the lead acetate and heating for 16 hours at 180° C. Distillation yields 40.98 g (83.6 percent) of the desired 1,1,2,2 tetrahydroperfluoroalkyl acetate.

EXAMPLE V

The procedure of Example III is repeated, but employing 12.84 g of cadmium oxide in place of the lead acetate and the reaction mixture heated from about 15 hours at 180° C. Distillation yields 42.35 g (86.3 percent) of the 1,1,2,2 tetrahydroperfluoroalkyl acetate.

EXAMPLE VI

The procedure of Example I is repeated using equivalent amounts of mercuric acetate and zinc acetate hydrate in lieu of cadmium acetate and running the reaction for 1 hour at 225° C. and 21 hours at 125° C respectively.

EXAMPLE VII

The procedure of Example I is repeated but employing the following amounts of cadmium acetate:
a. 11.5 g
b. 46.0 g
c. 69.0 g

EXAMPLE A 22.8 g of the mixed 1,1,2,2 tetrahydroperfluoroalkyl acetate of Example III, 2.9 g of dimethyl fumarate, and 0.9 g of p-toluenesulfonic acid are charged to a 50 ml flask fitted with a moisture trap and condenser. The resulting solution is stirred under a flow of nitrogen for 10.5 hours at a temperature of 125° C., then 18.5 hours at 150° C. The reaction mixture is then cooled to room temperature, 50 ml of chloroform added, and the solution then washed with 50 ml of warm water. The chloroform is distilled off, and then the residue distilled at 60° to 80° C. 1–4 mm yielding 17.69 g of product. The residue is recrystallized from hot heptane to give 15.3 g of bis(1,1,2,2 tetrahydroperfluoroalkyl) fumarate melting at 73° to 76° C. Yield 84.2 percent.

EXAMPLE B

The general procedure of Example A is followed by employing 48.0 g of 1,1,2,2 tetrahydroperfluorononyl acetate prepared according to the procedure of Example I, 5.7 g of dibutyl fumarate and 1.9 g of paratoluene sulfonic acid in a 200 ml flask. The reaction mixture is heated at 165° C. for 27 hours at a pressure of 480 mm Hg. Distillation yielded 24.4 g of bis(1,1,2,2-tetrahydroperfluorononyl) fumarate. Yield 88.6 percent.

EXAMPLE C

The reaction of Example B is repeated but employing in lieu of the paratoluenesulfonic acid catalyst 0.5 g of zinc acetate and 0.05 g lithium hydride. The reaction mixture is heated at 165° C. for 16 hours at atmospheric pressure. Distillation gives a 68.1 percent yield of the desired fumarate.

EXAMPLE D 585 g 1,1,2,2 tetrahydroperfluoroalkyl* (* Prepared from perfluoroalkyl iodide having the following approximate composition by weight:

| | |
|---|---|
| $C_6F_{13}CH_2CH_2$ I | 29.1% |
| $C_8F_{17}CH_2CH_2$ I | 46.5% |
| $C_{10}F_{21}CH_2CH_2$ I | 17.4% ) | acetate, 43.5 g of dimethylfumarate, 16.2 g of p-toluenesulfonic acid are mixed and heated at 170° C. for 24 hours while being kept under a nitrogen flow and pressure of 11″ Hg. At the end of the reaction the solution is cooled and diluted with 1,200 ml of chloroform. The chloroform solution is washed twice with 300 ml water, once with 500 ml 10 percent sodium bicarbonate solution, and finally with 500 ml of water. The chloroform is then removed by distillation and the residue is vacuum distilled to give fraction 1: 260 g of recovered 1,1,2,2 tetrahydroperfluoroalkyl acetate, boiling at 60° to 100° (100–150 mm) and fraction 2; 250 g bis (1,1,2,2-tetrahydroperfluoroalkyl) fumarate boiling at 100° to 200° C. (90–100 mm). The product has a melting range of 64° to 69° C.

EXAMPLE E 450 g of 1,1,2,2-tetrahydroperfluoroalkyl* (* Prepared from perfluoroalkyl iodide having the following approximate composition by weight:

| | |
|---|---|
| $C_6F_{13}CH_2CH_2$ I | 29.1% |
| $C_8F_{17}CH_2CH_2$ I | 46.5% |
| $C_{10}F_{21}CH_2CH_2$ I | 17.4% ) | acetates, 37.5 g of dimethylfumarate, and 38 parts of Amberlyst 15 (sulfonated polystyrene) are mixed and heated at 170° C. for 24 hours while being kept under a nitrogen flow and pressure of 11″ Hg. At the end of the reaction, the solution is cooled to 100° C. and the Amberlyst 15 filtered off. The reaction mixture is then vacuum distilled to remove 1,1,2,2-tetrahydroperfluoroalkyl acetate (147 g), the fraction boiling at 60° to 100° C. (100–150 mm). The remaining material, 232 g of bis (1,1,2,2-tetrahydroperfluoroalkyl) fumarate has a melting range of 64° to 69° C.

EXAMPLE F

The general reaction procedure of Example A is repeated, but employing the amounts of reactants, catalyst, temperature, times, and pressure indicated in the following table.

| Run | Acetate, moles | Dimethyl fumarate, moles | Catalyst | Mol | Temperature, °C. | Time, hours | Pressure, mm. Hg |
|---|---|---|---|---|---|---|---|
| a | 0.05 | 0.017 | Dibutyltin-oxide | 0.0067 | 125 | 27 | 760 |
| b | 0.05 | 0.017 | Dibutyltin-diacetate | 0.006 | 125 | 29 | 450 |
| c | 0.05 | 0.017 | Tetraisopropyl titanate | 0.0067 | 125 | 29 | 760 |
| d | 0.05 | 0.020 | Aluminum iscpropoxide | 0.005 | 125 | 21 | 760 |
| e | 0.05 | 0.020 | p-Toluene sulfonic acid | 0.01 | 150 | 17 | 450 |
| f | 0.12 | 0.030 | do | 0.009 | 165 | 27 | 480 |
| g | 0.04 | 0.020 | do | 0.01 | 175 | 5 | 400 |
| h | 0.05 | 0.020 | do | 0.01 | 165 | 15 | 760 |
| i | 0.06 | 0.020 | do | 0.01 | 150 | 10 | 760 |
| j | 0.05 | 0.020 | do | 0.01 | 100 | 30 | 760 |
| k | 0.04 | 0.020 | do | 0.01 | 160 | 3 | 400 |
| l | 0.10 | 0.020 | do | 0.01 | 200 | 1 | 760 |
| m | 0.05 | 0.020 | do | 0.01 | 125 | 30 | 760 |

EXAMPLE G

The procedure of Example A is repeated, but employing an equivalent amount of fumaric acid in lieu of dimethyl fumarate. Additional trials are also run using equivalent amounts of maleic, citraconic, mesaconic, and itaconic acids. In the case of maleic or citraconic acid temperatures below 130° C. are employed.

We claim:

1. A process for the preparation of an ester compound of the formula:

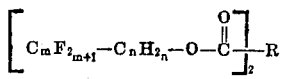

wherein $m$ is an integer of 3 to 18;

$n$ is an integer of 2 to 10;

R is an ethylenically unsaturated hydrocarbon radical derived from fumaric, maleic, citraconic, mesaconic, or itaconic acid, which comprises a. reacting a polyfluoroalkyl halide of the formula $C_mF_{2m+1}C_nH_{2n}X$ wherein $m$ and $n$ are as defined above, and X is iodine, bromine, or chlorine, with an acetate of the formula

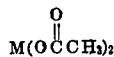

wherein M is a metal selected from cadmium, lead, mercury, and zinc, to form a polyfluoroalkyl acetate of the formula

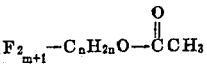

wherein $m$ and $n$ are as defined above, then b. reacting said polyfluoroalkyl acetate with fumaric, maleic, citraconic, mesaconic, or itaconic acid, or a diloweralkyl ester of said acid and recovering said ester from the reaction mixture.

2. A process as claimed in claim 1 wherein said acid is fumaric acid and X is iodine.

3. A process as claimed in claim 1 wherein $m$ is 6 to 12 and $n$ is 2.

4. A process as claimed in claim 3 wherein said acid is fumaric acid and M is cadmium.

5. A process as claimed in claim 3 wherein said acid is fumaric acid and M is lead.

6. A process as claimed in claim 2 wherein the reaction in (a) is carried at a temperature of 150° C. to 190° C., $m$ is 6 to 12 and in (b) the ratio of moles of diloweralkyl ester to polyfluoroalkyl acetate is between 1:2 and 1:5.

7. A process as claimed in claim 6 wherein reaction (b) is carried out in the presence of a catalytic amount of paratoluene sulfonic acid at a temperature of from 125° to 150° C.

8. A process as claimed in claim 6 wherein M is cadmium.

9. A process as claimed in claim 6 wherein M is lead.

10. A process as claimed in claim 6 wherein reaction (a) is carried out for about 1 to about 30 hours and reaction (b) is carried out for about 1 to 30 hours.

11. A process as claimed in claim 10 wherein M is cadmium.

12. A process as claimed in claim 10 wherein M is lead.

* * * * *